(No Model.) 2 Sheets—Sheet 2.
J. HAWLEY.
AUTOMATIC WATER HEATER.
No. 267,200. Patented Nov. 7, 1882.
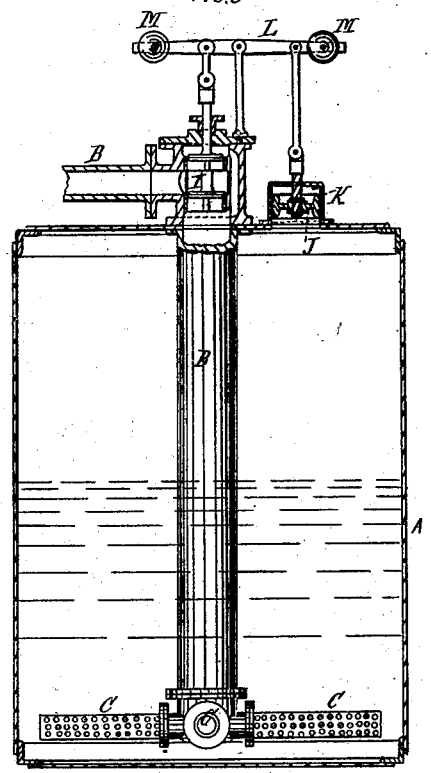
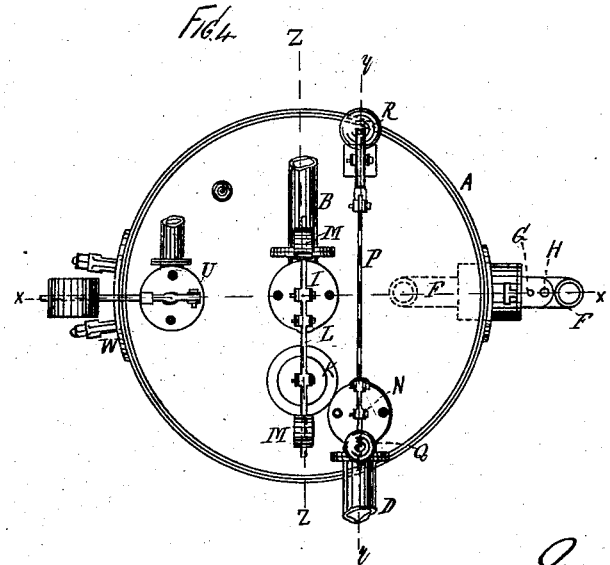
ATTEST
John Buckler
O. J. Morgan
James Hawley
INVENTOR
By A. P. Thayer
ATTORNEY

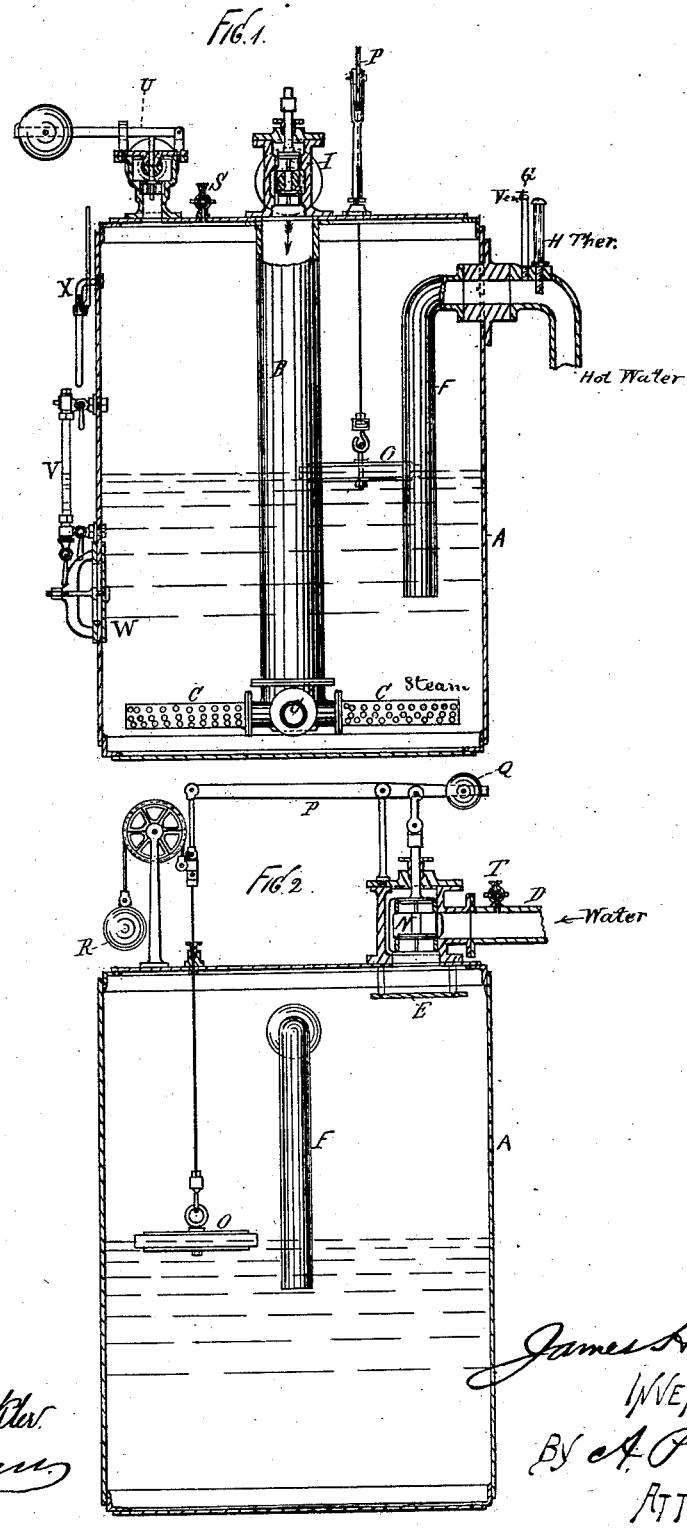

UNITED STATES PATENT OFFICE.

JAMES HAWLEY, OF LIVERPOOL, ENGLAND, ASSIGNOR TO FREDERICK MYERS, OF NEW YORK, N. Y.

AUTOMATIC WATER-HEATER.

SPECIFICATION forming part of Letters Patent No. 267,200, dated November 7, 1882.

Application filed January 20, 1882. (No model.)

*To all whom it may concern:*

Be it known that I, JAMES HAWLEY, of Liverpool, England, have invented a new and useful Improvement in Automatic Water-Heaters, of which the following is a specification.

The invention comprises attachments to an inclosed tank or boiler for automatically regulating the admission of steam for heating the water; also, similarly regulating the supply and discharge of the water for use in factories, bleacheries, laundries, and other places where steam is available for heating purposes, and where a constant supply of hot water is required, all as hereinafter more fully described, reference being had to the accompanying drawings, in which—

Figure 1 is a sectional elevation of the apparatus, taken on the line $x\ x$ of Fig. 4. Fig. 2 is a sectional elevation taken on line $y\ y$ of Fig. 4. Fig. 3 is a sectional elevation on line $z\ z$, and Fig. 4 is a top view.

A represents a boiler-tank, of any approved form and construction, for holding the water to be boiled by steam admitted through the pipe B, and distributed through the perforated branches C at the bottom directly into the water. The water is admitted through the supply-pipe D and discharged upon the splashing-plate E at the top of the tank for distributing it, so as to increase the effect of the steam.

F represents the discharge-pipe for the hot water. It is arranged in the form of a siphon to take the water from below the surface in the tank and conduct it above the level, so as to require a certain amount of steam-pressure to expel the water, and also to form a trap to prevent the escape of the steam. It has a vent-pipe, G, to prevent it from acting as a siphon, and also has a thermometer, H, to indicate the temperature of the water being discharged.

The regulator for controlling the admission of the steam consists of the balanced check-valve I in the steam-pipe and the piston J in the cylinder K, connected by the lever L, having adjusting-weights M, the piston being subject on one side to the pressure of steam in the tank and on the other side to atmospheric pressure.

The regulator for the inlet of water consists of the similar balanced check-valve N in the water-pipe, float O in the tank, and the balance-lever P on the top of the tank, with adjusting-weight Q and counterpoise R. The steam-pressure governs the discharge of the water.

For operation the steam-regulator is set by adjusting weights M so as to maintain sufficient pressure in the tank to expel the water to about or a little above the lower end of the discharge-pipe, when the piston will rise and close valve I and shut off the steam. As the water descends in the boiler the float falls, opening check-valve N and increasing the supply. The increasing supply of water cools the steam, lessens the pressure, and causes the piston to fall and, by opening valve I, increase the supply of steam, and it also causes the float to rise and check the supply of water.

The quantity of water heated in a given time may be varied within a wide range by varying the adjustments of these steam and water inlet regulators.

There will of course be suitable stop-valves in the steam and water pipes to close them entirely when the operation is to be stopped.

The tank is provided with a petcock, or it may be a check-valve, at S, to be opened by hand or automatically, to prevent a vacuum in it when the operation ceases, and also to prevent the water siphoning back into the boiler in case valve I should fail to close. A similar petcock or check-valve may be set in the steam-valve at T.

U represents a safety-valve; V, a glass water-gage; W, a man-hole cover, and X steam-cock.

What I claim, and desire to secure by Letters Patent, is—

1. The combination, in a water-heater, of the tank or boiler A, steam-supply pipe and its regulator, water-supply pipe and its regulator, and the discharge-pipe F, substantially as described.

2. The combination, with tank or boiler A, having an automatic steam-supply apparatus and an automatic water-supply apparatus, of a discharge-pipe for the hot water, forming a trap to prevent the escape of the steam by receiving the water below the level thereof in the tank and delivering it from said tank above said level, substantially as described.

Witnesses:    JAMES HAWLEY.

ALEX. HENDERSON,
*Clerk with Messrs. Miller, Peel, Hughes & Co., Solicitors, Liverpool.*

EDWD. LEWIS LLOYD,
*Clerk with Messrs. Lowndes & Son, Notaries, Liverpool.*